(12) United States Patent
Thai et al.

(10) Patent No.: US 11,880,564 B2
(45) Date of Patent: Jan. 23, 2024

(54) REGIONS WITH DIGITAL INK INPUT

(71) Applicant: HEWLETT-PACKARD DEVELOPMENT COMPANY, L.P., Spring, TX (US)

(72) Inventors: Thong Thai, Spring, TX (US); Mario E. Campos, Spring, TX (US); Ron Y. Zhang, Fort Collins, CO (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 17/922,416

(22) PCT Filed: Apr. 30, 2020

(86) PCT No.: PCT/US2020/030651
§ 371 (c)(1),
(2) Date: Oct. 31, 2022

(87) PCT Pub. No.: WO2021/221647
PCT Pub. Date: Nov. 4, 2021

(65) Prior Publication Data
US 2023/0176728 A1 Jun. 8, 2023

(51) Int. Cl.
*G06F 3/048* (2013.01)
*G06F 3/04883* (2022.01)
*G06T 7/13* (2017.01)
*G06F 3/04847* (2022.01)

(52) U.S. Cl.
CPC ...... *G06F 3/04883* (2013.01); *G06F 3/04847* (2013.01); *G06T 7/13* (2017.01)

(58) Field of Classification Search
None
See application file for complete search history.

(56) References Cited

U.S. PATENT DOCUMENTS

| 7,705,833 | B2* | 4/2010 | Kim | ............... H04M 1/72469 715/779 |
| 8,625,018 | B2 | 1/2014 | Bilbrey et al. | |
| 9,154,722 | B1 | 10/2015 | Muniyandi et al. | |
| 2008/0192013 | A1 | 8/2008 | Barrus et al. | |
| 2009/0249235 | A1* | 10/2009 | Kim | ................. G06F 3/04886 715/788 |
| 2011/0047459 | A1* | 2/2011 | Van Der Westhuizen | ................. G06F 3/04883 345/173 |

(Continued)

FOREIGN PATENT DOCUMENTS

CN 101365117 A 2/2009
WO 2017/039125 A1 3/2017

(Continued)

*Primary Examiner* — Tuan S Nguyen
(74) *Attorney, Agent, or Firm* — Knobbe, Martens, Olson & Bear, LLP

(57) ABSTRACT

An example display device includes a panel and a controller to define a boundary between a first region of an input layer of the panel and a second region of the input layer of the panel. The example controller disables digital ink input for the first region when the first region is designated for video output and the controller enables digital ink input for the second region when the second region is designated for receiving digital ink input.

15 Claims, 6 Drawing Sheets

(56) References Cited

U.S. PATENT DOCUMENTS

| | | | |
|---|---|---|---|
| 2011/0124376 A1* | 5/2011 | Kim | G06F 3/04883 345/173 |
| 2012/0131497 A1* | 5/2012 | Jitkoff | G06F 3/04883 715/786 |
| 2016/0210041 A1 | 7/2016 | Yang et al. | |
| 2016/0232146 A1 | 8/2016 | Su et al. | |
| 2016/0335242 A1 | 11/2016 | Cheng et al. | |

FOREIGN PATENT DOCUMENTS

| | | |
|---|---|---|
| WO | 2017/071599 A1 | 5/2017 |
| WO | 2019/045836 A1 | 3/2019 |
| WO | 2019/184348 A1 | 10/2019 |

\* cited by examiner

REGIONS WITH DIGITAL INK INPUT

BACKGROUND

Accessories and peripheral devices may be coupled to a compute device to enhance a computing experience. For example, a human interaction device (HID) may be coupled to the compute device to allow the user to manipulate the HID and data corresponding to those manipulations are sent to the compute device to be used as input. For another example, a compute device may include a display device to produce a visual representation of an image by operating light-emissive circuitry represented as a number of pixels based on image data processed by circuitry of the compute device. An example computing experience enhanced by a peripheral device is a digital pen used to interacted with a digital ink surface on a display device to draw images such as handwritten notes.

DETAILED DESCRIPTION

Figure 1:
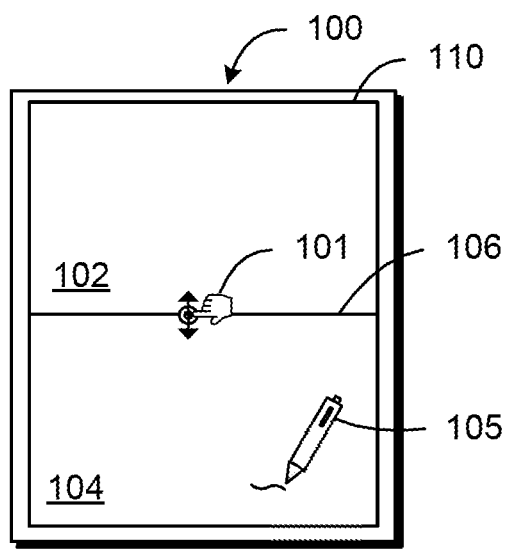
FIGS. 1-3 are diagrams depicting example display devices.

In the following description and figures, some example implementations of display devices, circuitry, and/or methods of defining display regions are described. In examples described herein, a display device is a device to present content visually. A display device, for example, may produce a visual representation of an image by operating light-emissive circuitry, light-reflective circuitry, or a combination thereof, represented as a number of pixels based on processed image data. Example displays may include a panel such as a liquid crystal display (LCD) panel, an organic light-emitting diode (OLED) panel, a micro light emitting diode (μLED) panel, or other display technology. In this manner, the display device may include layers of panel circuitry that when operated produce visual output. In some examples, a display device may also include circuitry to operate the panel, such as a monitor scaler, such that the light-generating components of the panel produce visual output. A display device may include other audio or video components integrated in the device, such as an optical sensor to register light information and transceiver circuitry to provide a communication channel.

In some examples described herein, a display device is integrated as part of (or otherwise includes) a compute device, such as a general-purpose computer. Examples of a general-purpose computer with a display device integrated may include form factors such as a notebook computer, a tablet computer, a mobile smartphone, and the like. In other words, some of the examples described herein as display devices are compute devices within a display panel integrated into the compute device. However, examples discussed herein as display devices are not limited to display devices with hosts integrated therein or limited to display devices without hosts integrated therein.

Display devices may include a layer of circuitry that allows for input to be received on the display device. Example input display technology include touch screen technology and digital pen input technology. Touch screen technology includes resistive touch screen technology, capacitive touch screen technology, surface acoustic touch screen technology, optical (e.g., infrared) touch screen technology, and the like. Digital pen input technology includes active pen technology, positional pen technology, and capacitive pen technology, which may use optical (e.g., infrared) technology, electromagnetic technology, and the like. Some touch technology may be useable with human touch or a digital pen, such as a display device with a capacitive input layer, where the capacitive layer is able to identify the tip of a finger or detect the tip of a digital pen on a location on the screen of the display device. For example, a capacitive touch/pen technology may comprise a projected capacitive (p-cap) sensor. Some example material types for a capacitive technology layer include, but are not limited to, indium-tin-oxide (ITO), silver nanowire, metal mesh, carbon nano-tube, and poly(3,4-ethylenedioxythiophene) (PEDOT) film. Such material layers are clear, electrically-conductive layers that may be fabricated into a row and column p-cap sensor array, and that may be formed on a clear plastic layer (e.g., polyethylene terephthalate (PET)) or a clear glass substrate. Devices with digital ink input capability allow a human-interaction device (HID) to provide input state information in addition to location. Indeed, in some examples, a digital pen includes a controller and a transmitter to provide information to the display device (e.g., the digitizer of the display device). In some examples, information provided from the digital pen may be used in conjunction with the input received on the display device via the input layer. As used herein, a digital pen is a physical HID that includes electrical components operable to generate input on the display device and provide pen attribute information to the display device. For example, the digital pen may be a pencil-shaped stylus with circuitry to communicate pen state information such as location, pressure, tilt, rotation, a button press, etc. A digital pen is an example of an accessory device to enhance an experience with a compute device.

A display device may include a digital ink input surface where the display device includes an input layer capable of receiving digital ink input, such as from a HID (e.g., a stylus or digital pen). A display device with a digital ink input surface is a computer input device that enables a user to draw images, animations and graphics, by hand with a digital pen, similar to the way a person draws images with a pencil and paper. Example digital ink display devices include graphics tablet, digitizer, drawing tablet, digital pad, digital art board, and the like. The input surface of a digital ink device may be a direct ink surface (e.g., digital ink is substantially immediately displayed upon the same panel on which the input is received) or an indirect ink surface (e.g., digital ink is displayed upon a panel separate from the input surface on which the input is received). The region of the digital ink device that receives input from the digital pen is generally fixed in the examples above. In this manner, a user may be limited in the type of functionality to perform on a single display device or may switch between multiple digital ink devices to create a project, for example.

Various examples described below relate to defining a boundary of the display device that designates a region of the display device for digital ink input and a region of the display not for digital ink input. By enabling a portion of a display device to act as an indirect ink surface, a user may use digital ink input as well as utilize functionality of a direct ink surface or touch screen within a different region of the same display device. And by including circuitry to allow the boundary between regions to be adjustable, the user may adjust the size of the indirect ink surface to appropriately accommodate the creative task being performed and allow for live output of what is being manipulated on the same plane of view, which may reduce the amount of time spent between orienting the indirect input with the displayed output, for examples.

Figure 2:
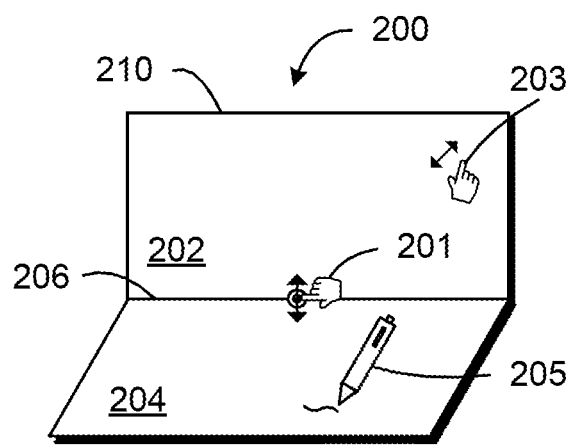
Figure 3:
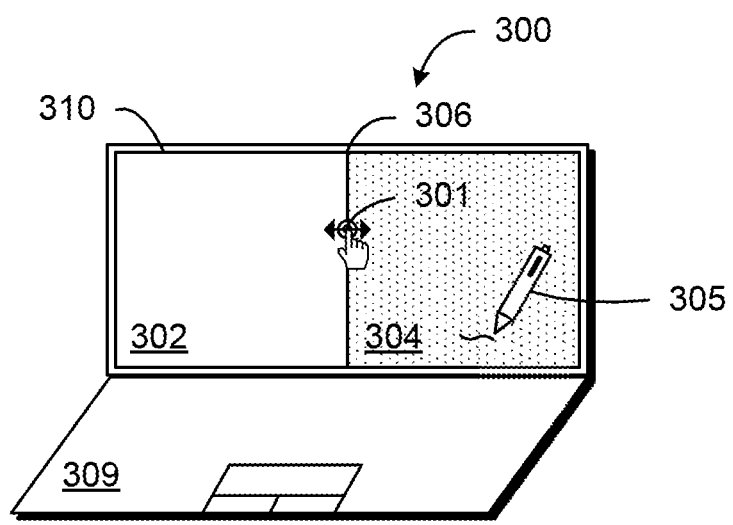

FIGS. 1-3 are diagrams depicting example display devices 100, 200 and 300. FIGS. 1-3 depict various form factors of display devices in which circuitry to provide an adjustable digital ink region may be implemented. Such circuitry is discussed in more detail with respect to FIGS. 5-7. Referring to FIG. 1, the example display device 100 includes a panel 110. The panel 110 may be virtually divided into regions 102 and 104 at boundary 106. The circuitry of the display device 100 may restrict digital ink input to the region 104 and provide display output at region 102. In this manner, any digital ink input at region 104 from a digital pen 105 may generate corresponding output in the region 102 (where similar input at region 102 may not generate the same output in the region 102). In some examples, touch input may be enabled for region 102, region 104, or both. The regions of the display device 100, as discussed herein, are virtual regions of the display device and may be designated using visual cues such as a highlighting border to designate capabilities of the region.

The display device 100 may be a tablet computer with a rigid bezel around the panel 110. The circuitry of the display device 100 allows for input to be received, such as touch or gesture input 101, to move the boundary 106 along the available display output area of the panel 110. As mentioned with the regions, the boundary 106 may be a virtual boundary. The boundary 106 may be designated with a visual marker output on the panel 110, such as a digital line or a virtual toolbar. The boundary 106 of FIG. 1 may be moved to a different horizontal position using an appropriate gesture 101 (e.g., such as dragging up or down along the panel 110). In some examples, the boundary 106 may be moved such that the entire output portion of the panel 110 is used for digital ink input or such that the entire output portion of the panel 110 is disabled for receiving digital ink input. In this manner, the display device 100 may be used as a full output (e.g., used as traditional display device) or full digital ink input (e.g., used as a traditional indirect inking surface) when the boundary is set to one of the edges of the panel 110.

The display device 100 may include circuitry to allow each region to be designated (e.g., selected) for a type of input and designated to disable a type of input. In this manner, each region 102 and 104 may be selected as direct ink mode, indirect ink mode, live video mode, touch mode, or a combination thereof. Each mode represents a state of a combination of inputs that are enabled or disabled at the corresponding region. For example, indirect ink mode may refer to an operational state of a display region that has touch input disabled, video output disabled, and digital ink input enabled within that region. For another example, direct ink mode may refer to an operational state of a display region that has video output enabled and digital ink input enabled. For yet another example, live video mode may refer to an operational state of a display region where video output is enabled and digital ink input is disabled. To have digital ink input disabled represents that the pen state information, such as a pressure, tilt, and rotation) is not communicated, not received, disregarded, discarded, or not used at the corresponding region of the display device. In some examples, the region 202 or 204 may be limited to which mode may be enabled, such as based on which application is operating on the host display device. In some examples, the regions 202 and 204 may be freely swappable between different modes. In some examples, digital ink input is disabled upon designation of the region to be designated for digital ink input, such as automatically upon splitting the panel at a default location or in response to input received based on a user action corresponding to turning on digital ink mode for a region. In some examples, enabling and disabling of digital ink input may occur based on input received based on a user action corresponding to toggling of the mode for that region. In some examples, digital ink input is enabled while a button is pressed and disabled when the button is not pressed.

Figure 4:
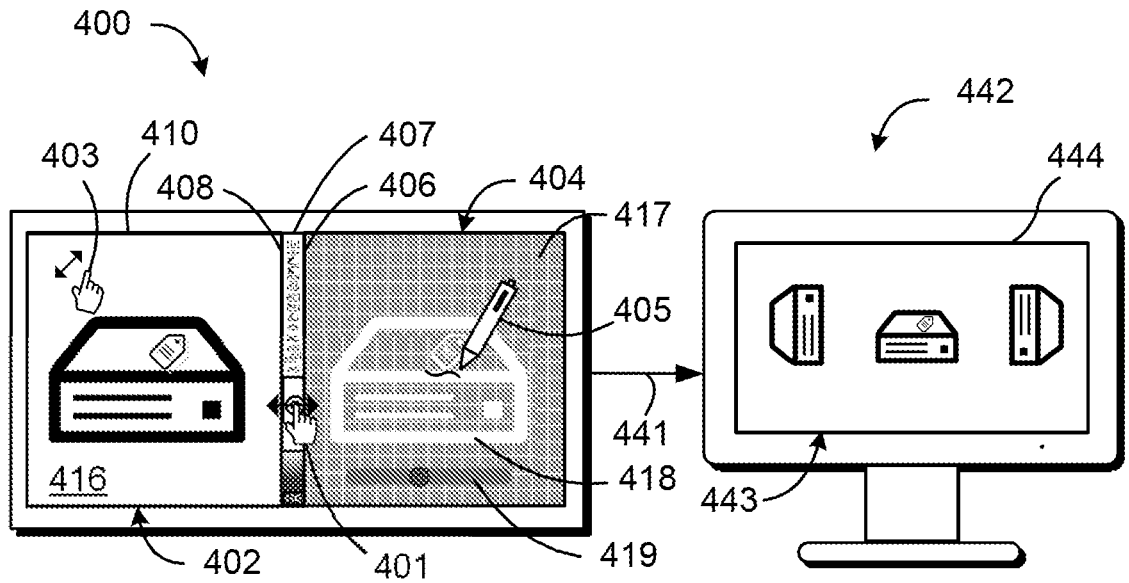
FIG. 4 depicts an example environment in which an example display device is coupled to an example external display device.

The panel 110 of FIG. 1 may be the same as panels 210, 310, and 410 of FIGS. 2-4 respectively. In this manner, discussions of regions of FIGS. 2, 3, and 4 (and the potential inputs usable at those locations) are applicable to the regions of FIG. 1 and vice versa. The same is applicable to the region boundaries of the FIGS. 1-4. The number of regions in the examples of FIGS. 1-4 are limited to two quadrilateral regions for clarity, however, any number of regions may be manipulatable in size and the regions may be any appropriate geometry. Thus, the boundary line may be curved, jagged, or otherwise not a straight line as may be desirable by the user.

Referring to FIG. 2, the example display device 200 may be a flexible display device, such as a foldable tablet computer or foldable smartphone. The default location for the boundary 206 may be designated by a physical identifier, such as where the panel 210 folds or where a physical toolbar is located. In this manner, the virtual boundary 206 may align with physical design features when initially operated and may be manipulated (e.g., using gesture 201) to adjust position as desirable by the user such that the region 204 parallel to a desk surface on which the display device resides may be the input region for the digital pen 205 and the region 202 oblique to the desk surface may be the output region. In some examples, touch input is enabled at region 202 to manipulate the output view, such as using gesture input 203 to zoom in or zoom out at a location of the electronic document displayed at region 202. The example display device 200 of FIG. 2 is a form factor depicting a bezel-less display.

Referring to FIG. 3, the example display device 300 may be a notebook computer, such as a clamshell notebook with a hinge between the display section (e.g., the panel 310) and a mechanical input section 309, such as a keyboard and/or trackpad. In this example, the display regions 302 and 304 may be manipulated in their apportionment across the length of the panel 310, such as by using touch input 301. In the example of FIG. 3, the boundary 306 can be moved left or right. The user may switch pen input between regions 302 and 304, such as default the right portion 304 to be the area for digital ink input from pen 305 and if the user is left-handed, changing the left region 302 to be the area for digital ink input from pen 305. The example of FIG. 3 depicts that digital input from pen 305 may be received in conjunction with input from another input device (e.g., the keyboard or trackpad of section 309) and the combination may be used to generate a change to the displayed output at region 302, such as a change to the size of the region 302.

The region 304 of FIG. 3 depicts a navigation pattern displayed on the digital ink enabled region 304 and not on the video output region 302.

FIG. 4 depicts an example environment in which an example display device 400 is coupled to an example external display device 442. The example display device 400 is a host display device with a video output port coupled to an external display device 442, such as a secondary computer monitor, to display image data on the panel 444 based on the same data source providing image data to display at region 402. For example, the external display device 442 may generate a visual representation 443 corresponding to video output associated with visual output 416 displayed at the first region 402 of the display panel 410. In the example of FIG. 4, the region 402 includes digital output 416 of an electronic image document zoomed in at a portion of the document (such as by using a touch gesture 403) and external display device 442 is displaying the entire electronic document fit to screen. In other examples, the image data displayed on the external display device 442 may be zoomed to the same visual dimensions as the output region 402 of the display device 400 or display different visual dimensions of the data source to be manipulated by digital ink input from pen 405.

The output image data 441 is providable to the external display device 442 via an output port of the display device 400, for example. In some examples, the external display device 442 may be coupled to the display device 400 wirelessly, such as via personal area network.

The example display device 400 depicts example regions 402 and 404 where example region 402 has digital ink input disable and example region 404 has digital ink input disabled. In the example of FIG. 4, the toolbar 407 is located at a region of the display device 410 that has all input capabilities enabled, such as both touch input and digital pen input to allow either the pen 405 or a hand of a user to select a function from the toolbar 407. This may allow for ease of use of the toolbar functionality during operations using a HID or touch input, such as in transfers between interacting with the regions 402 and 404, for example.

The boundaries 406 and 408 define the edges of the regions 402 and 404 where the digital ink input is either enabled or disabled. The boundaries 406 and 408 define the region of the toolbar 407. In other words, the boundaries 406 and 408 define three regions on the panel 410 of the display device 400, the first being the live output region 402, the second being the digital ink input region 404, and the third region being the area of the toolbar 407. The toolbar 407 may include a designated section on which input, such as a gesture, may be performed to move the toolbar 407 as well as concurrently change the size of the other regions 402 and 404.

A region designated for digital ink input, such as region 404, may be designated by replacing video output with a navigation pattern 417 and/or a trace image 418. A navigation pattern may be a pattern of dots and/or dashes extending laterally and longitudinally across the display region. For example, the region 404 may change the output layer to black and a layer of the panel 410 may include light pipe features that may be selectively illuminated to show a pattern for the region designated for digital ink input (e.g., the pattern is enabled at region 404) and disabled for regions not designated for digital ink input (e.g., the pattern is disabled at region 402). For another example, the navigation pattern may be digital, such as a virtual data layer overlaid onto appropriate pixel locations when combined into a frame buffer for display on the display device 400. The trace image 418 is an altered version of the image source, such as visual output 416 displayed at region 402. For example, the trace image 418 may be generated by a processor resource of the display device 400 by performing an edge detection operation on the video source for region 402 and causing the detected edges to display in a contrasting color to the background displayed at region 404.

The navigation pattern and the trace image are adjustable, such as based on finger-made zoom gestures made within the digital ink input region 404. In that example, a zoom gesture 403 performed on the video output region 402 may enlarge or shrink the video output of a source document, while a zoom gesture performed on the digital ink input region 404 may enlarge or shrink the navigation pattern and/or the trace image 418. The colors of the navigation pattern 417 and/or the trace image 418 may be adjustable. Other attributes, such as rotation or the type of pattern used for the navigation pattern or the sizes of the lines used by the navigation pattern and/or the trace image, may be adjustable. For another example, the opacity of the trace image 418 and/or the navigation pattern 417 may be adjusted using a slider 419 displayed at the digital ink enabled region 404. In some examples, an input received (such as input received at an input layer of a display panel) may be used to pan or rotate the view of the output image as displayed at the corresponding region of region. In this manner, the orientation or other attributes of the displayed output and/or reference image may be interacted with using input from a user, such as touch gestures or pen input gestures.

The circuitry of the display device 400 may identify a connection with an external display device 442 and determine the capabilities of the external display device 442. The circuitry of the display device 400 may virtualize the output region across a number of display devices connected to the display device 400 as well as the output region 402. For example, display device 400 may identify the visual dimensions of the electronic document to be displayed and map the dimensions across the region 402 and 444, such that the region 402 and the output to the panel 444 constitute a single logical screen (e.g., a virtual panel that includes the dimensions of multiple physical panels as mapped to a virtual space). In another example, the circuitry of display device 400 may determine that the external display device 444 includes digital ink input capabilities and virtualize the digital ink input region across regions 404 of the display device and the input region of the display device 442 (e.g., across panel 444). In this manner, the output displayed and/or input received on panel 444 and panel 410 may be mapped virtually by circuitry of the display device to act as a single logical screen, which may be a single logical screen with digital inking capability. As used herein, virtualization of a region or output stream is to create a virtual space mapping among a number of regions or output streams, such as to enable multiple regions or output streams to act as a single region or output stream or to enable a single region or output stream to act as multiple regions or output streams.

Figure 5:
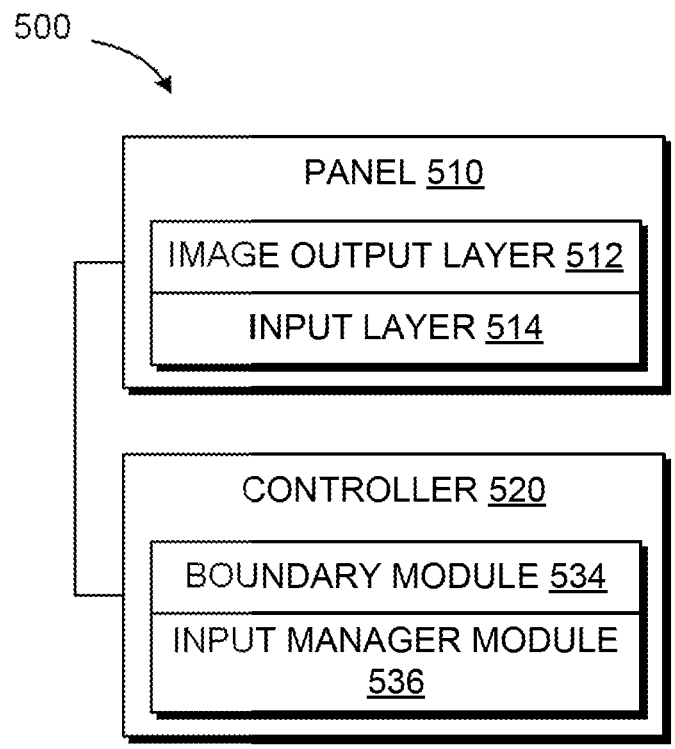
FIG. 5 is a block diagram depicting an example display device.

FIG. 5 is a block diagram depicting an example display device 500. The display device 500 of FIG. 5 generally includes a panel 510 and a controller 520. The panel 510 of FIG. 5 includes an image output layer 512 to generate display output and an input layer 514 to receive input via the panel 510. The image output layer 512 represents hardware, such as circuitry and materials, of the panel 510 to produce content visually, such as via the display technologies discussed earlier herein. The input layer 514 represents hardware, such as circuitry and materials, of the panel 510 to generate a signal corresponding to a location on the panel 510 at which a change to the environment of the panel 510 is identified. For example, though labeled as single layers for simplicity, the image output layer 512 and the input layer 512 of the panel may represent multiple physical layers of circuitry and materials, such as ITO, glass, and thin-film transistor circuitry. The input layer 514 is capable of receiving input via a digital pen. The input layer 514 may also be capable of receiving input via other methods, such as a touch screen. Example display input technologies and example display output technologies have been discussed earlier herein.

The controller 520 is circuitry or a combination of circuitry and executable instructions to define a boundary between regions of the panel and to disable digital ink input for a region of the panel. For example, the controller 520 may be a combination of circuitry and executable instructions to define a boundary between a first region of the input layer of the panel and a second region of the input layer of the panel based on an identifier associated with a user preference, disable digital ink input for the first region when the first region is designated for video output, and enable digital ink input when the second region is designated for receiving digital ink input.

In the example of FIG. 5, the boundary module 534 represents program instructions that when executed cause a boundary between regions of the display to be defined based on a user preference. A user preference is represented by a preference identifier, which, as used herein, is a data structure to store a user-defined reference corresponding to a location on the panel 510. The user preference may be adjusted during a startup routine, by an operating system setting, or adjustments made while executing an application on the host compute device. The user preference may be set to a ratio between sizes of the regions. For example, the user may have a preference to split the available visual output of the panel into two equal size regions or in a 4:1 ratio between regions. The boundary is adjustable based on modifications to the user preference (e.g., the preference identifier). For example, the controller 520 may identify a gesture on the input layer 514 to moving the boundary to a different location of the display and modify data corresponding to the user preference to coincide with the new location. Thus, the controller 520 may cause boundary location to update as the user preference updates. In some examples, such as in the implementation of a flexible display device 200 of FIG. 2, the user preference is a default corresponding to a physical location on the panel, such as where the image output layer of the panel folds.

In some examples, the boundary may be adjustable based on input, such as touch input received by the input layer, when the display device is in zone edit mode. The controller 520 may disregard input, such as a boundary change gesture, when the display device is not in zone edit mode. As used herein, zone edit mode is a state of the display device 500 to allow a change to regions of the display device. In zone edit mode, an interaction with the display device that may change the source data (such as drawing on the electronic document) might instead be used to modify an attribute of the region, such as change a size or switch a region input capability.

In the example of FIG. 5, the input manager module 536 represents program instructions that when executed cause a region of the panel 510 to be disabled from generating, providing, or using digital input received at the corresponding region of the input layer 514 of the panel 510. For example, the controller 520 may cause digital pen input received at the input layer 514 to be disregarded when the location of the digital pen input corresponds to the disabled region of the panel 510. In some examples, execution of the input manager module 536 may be in response to a change in boundary identified by the controller 520 via execution of the boundary module 534.

The controller 520 may enable digital pen input on a region of the display device 500 by default and may cause a region to be disabled from receiving digital ink input when a region (e.g., a different region) is selected for receiving digital ink input. In this manner, a region of the display device which is not selected for digital ink input will be unaffected by a stray or unintentional digital pen input occurring in a disabled region and allow for digital input to be received at a selected region. In this manner, the display device 500 may offer regions providing the benefits of indirect ink input while allowing for imagery to be displayed, such as the benefits of direct ink input devices, for example.

In some examples, execution of the input manager module 536 may cause a region of the display to be disabled from receiving touch input. For example when the input layer of the panel includes touch screen technology to receive touch input and includes digital pen technology to receive digital pen input, the controller 520 may disable digital pen input for a first region of the display device 500, enable touch input for the first region of the display device 500, disable touch input for a second region of the display device 500, and enable digital pen input for the second region of the display device 500. Disablement of input capabilities may be performed by executing program code to handle the input differently (e.g., discard the input) or by causing a change in the operational state of the input layer 514 (e.g., removing electrical power from the input circuitry at that region), causing the digital pen to not transmit the pen state information, or otherwise hinder a processor resource from receiving input with the pen state information from the disabled region and/or processing input corresponding to the disabled region using the pen state information. An example of input disablement may be palm rejection techniques. By disabling touch input in a region designated for digital pen input, palm rejection techniques may be avoided for implementation, for example.

Figure 6:
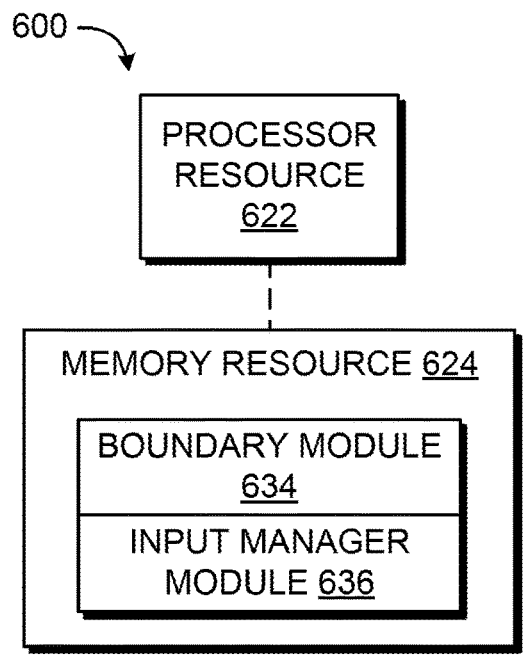
FIG. 6 is a block diagram depicting an example controller.
Figure 7:
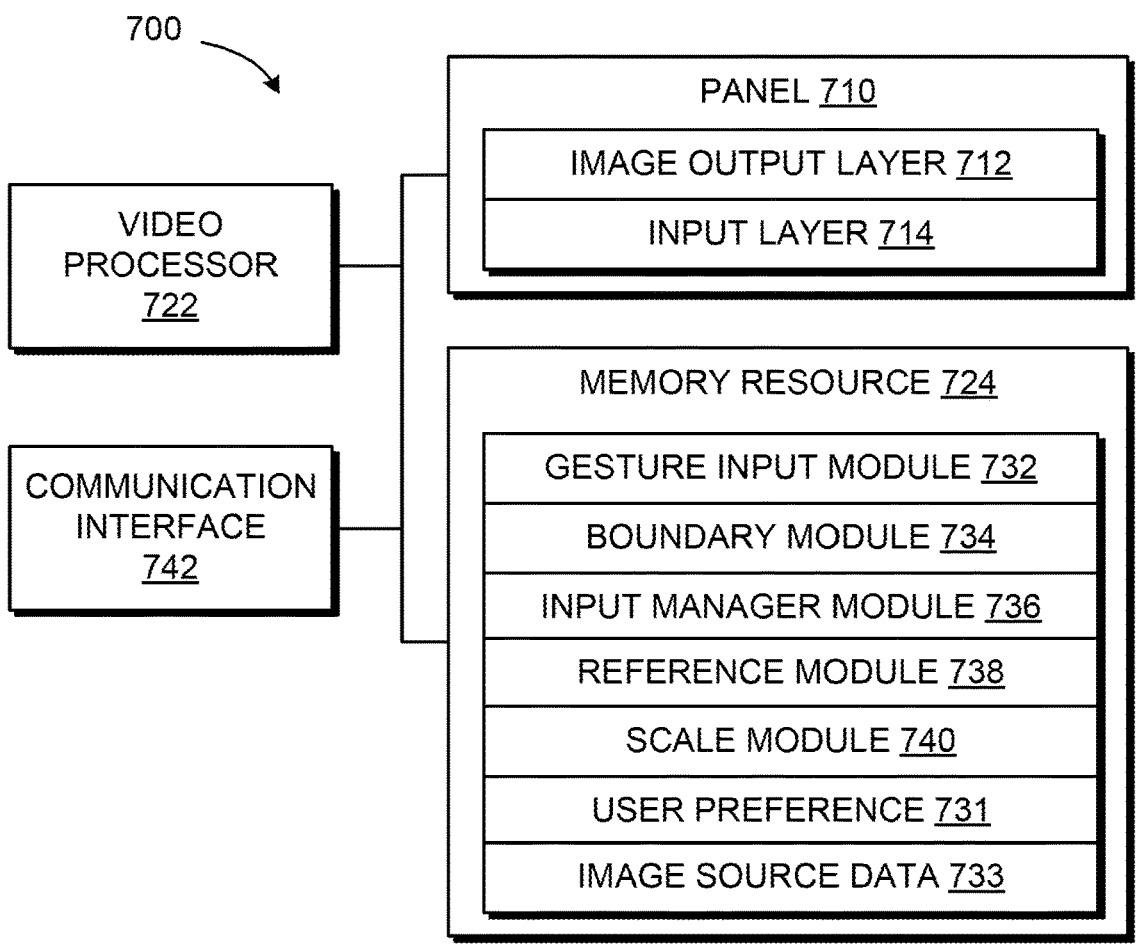
FIG. 7 is a block diagram depicting an example display device.

In some examples, functionalities described herein in relation to any of FIGS. 5-7 may be provided in combination with functionalities described herein in relation to any of FIGS. 1-4 and/or 8-11.

Referring to FIG. 6, FIG. 6 is a block diagram depicting an example controller 620. The controller 620 may be implemented in a display device (such as integrated in a video processor of the display device) or coupled to the display device (such as coupled to a video processor of the display device). The components of the example controller 620 of FIG. 6 comprise a memory resource 624 operatively coupled to a processor resource 622. Referring to FIG. 6, the memory resource 624 may contain a set of instructions that are executable by the processor resource 622. The set of instructions are operable to cause the processor resource 622 to perform operations of the controller 620 when the set of instructions are executed by the processor resource 622. The set of instructions stored on the memory resource 624 may be represented a boundary module 634 and an input manager module 636. The boundary module 634 and the input manager module 636 represent program instructions that when executed cause the same functions as the boundary module 534 and the input manager module 536 of FIG. 5, respectively. The processor resource 622 may carry out a set of instructions to execute the modules 634, 636 and/or any other appropriate operations among and/or associated with the modules of the controller 620.

For example, the processor resource 622 may carry out a set of instructions to determine a first boundary between a first region of an input layer of a display panel and a second region of the input layer of the display panel, determine a second boundary between the second region of the input layer and a third region of the input layer of the display panel, disregard digital ink input within the first region when the first region is designated for video output, enable digital touch input and digital ink input within the second region when a toolbar is displayed in the second region, and enable digital ink input within the third region when the third region is designated for receiving digital ink input.

For another example, the processor resource 622 may carry out a set of instructions to generate a trace image using an edge detection operation, adjust the first boundary and the second boundary based on digital touch input on the input layer of the display panel corresponding to movement of the toolbar displayed on the display panel, cause the trace image and a navigation pattern to display at the third region based on the adjusted visual dimensions and a user-defined percentage of opacity, cause the video processor to adjust the visual dimensions of the first region or the second region based on a signal corresponding to gesture input received at a location of the input layer of the display panel, and restrict digital ink input to an edge of the trace image by disregarding digital ink input outside of the edge of the trace image.

For yet another example, the processor resource 622 may carry out a set of instructions to cause a video processor to scale video from a host to a first region of a display device at a first set of visual dimensions, and, when a second region is selected for direct ink mode, cause the video processor to scale video from the host to the second region at a second set of visual dimensions different from the first set of visual dimensions.

For yet another example, the processor resource 622 may carry out a set of instructions to identify an auxiliary display device is coupled to a display device with digital ink input functionality, cause a video processor to provide ink input data to a host based on digital ink input received within a region of the input layer of the display panel, and cause the video processor to provide image data corresponding to the input layer of the display panel at the region to an auxiliary display device coupled to the host compute device.

The controller 620 has been described as circuitry or a combination of circuitry and executable instructions. Such components may be implemented in a number of fashions. Looking at FIG. 6, the executable instructions may be processor-executable instructions, such as program instructions, stored on the memory resource 624, which is a tangible, non-transitory computer-readable storage medium, and the circuitry may be electronic circuitry, such as processor resource 622, for executing those instructions. The instructions residing on a memory resource may comprise any set of instructions to be executed directly (such as machine code) or indirectly (such as a script) by a processor resource. Although the modules illustrated in FIG. 6 and discussed in other example implementations perform specific functionalities in the examples discussed herein, these and other functionalities may be accomplished, implemented, or realized at different modules or at combinations of modules. FIG. 7 depicts yet another example of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 622 may be a central processing unit (CPU) that enables display region boundary adjustment and digital ink input disablement by fetching, decoding, and executing modules 634 and 636. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). An example processor resource discussed herein is a video processor. An example video processor may be a monitor scaler, a timing controller, integrated graphics circuitry, a graphics processing unit (GPU), and the like, or a combination thereof. The functionality discussed herein with respect to the controllers 520 and 620 may be performed by a video processor. A processor resource may include multiple processing elements that are integrated in a single device or distributed across devices. A processor resource may process the instructions serially, concurrently, or in partial concurrence.

A memory resource represents a medium to store data utilized and/or produced by a display device. The medium is any non-transitory medium or combination of non-transitory media able to electronically store data, such as modules of a display device and/or data used by the display device. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. Examples of memory resource include non-volatile memory resource such as read-only memory (ROM), a volatile memory resource such as random-access memory (RAM), electrically erasable programmable ROM (EEPROM), a storage device such as a hard drive (HD), a solid-state drive (SSD), and the like, or a combination thereof. A memory resource may be said to store program instructions that when executed by a processor resource cause the processor resource to implement functionality of the controller 620. A memory resource may be integrated in the same device as a processor resource or it may be separate but accessible to that device and the processor resource. A memory resource may be distributed across devices.

In some examples, the executable instructions may be part of an installation package that when installed may be executed by a processor resource to perform operations of a display device, such as methods described with regards to FIGS. 8-11. In that example, a memory resource may be a portable medium such as a compact disc, a digital video disc, a flash drive, or memory maintained by a computer device, such as a web server, from which the installation package may be downloaded and installed. In another example, the executable instructions may be part of an application or applications already installed.

FIG. 7 is a block diagram depicting an example display device 700. The display device 700 of FIG. 7 generally includes a panel 710, a video processor 722, a memory resource 724, and a communication interface 742. The panel 710 is the same as panel 510 of FIG. 5, and, therefore, the corresponding description is not repeated in its entirety.

The communication interface 742 is an electrical component capable of communication with a device external to the display device 700. For example, the communication interface 742 may include a transceiver for wireless communication or an input/output (I/O) port coupled to an I/O controller of the display device 700. The display device 700 may utilize a communication interface, such as communication interface 742, to exchange data between the display device 700 and an external display device, such as in the example environment depicted in FIG. 4. Example communication interfaces include any I/O controller implementing wireless communication protocols and/or managing the I/O bus of the display device. For example, the communication interface 742 may include a controller to transmit part of the virtualized output region that corresponds to an external display device via an I/O port to which the external display device is connected.

The video processor 722 may be any processor resource implemented to prepare data to cause the panel 710 to present visual imagery via the image output layer. Example video processors include a monitor scaler, a graphics processing unit (GPU), integrated graphics circuitry, a video display controller, and the like. Though shown separate from the video processor 722, the memory resource 724 may be an integrated component of the video processor 722 in some examples. The video processor 722 includes circuitry to perform operations discussed with respect to the controllers 520 and 620 of FIGS. 5 and 6, respectively, and may include circuitry to perform other operations discussed herein, such as methods 800, 900, and 1000 of FIGS. 8-11.

The memory resource 724 includes a boundary module 734 and an input manager module 736 that represent the same instructions as the boundary module 534 and input manager module 536 of FIG. 5 and are executable by the video processor 722 to cause the display device to perform the corresponding operations. Other modules are depicted in FIG. 7 to clarify functionality of the display device 700. Thus, although the various modules are shown as separate in FIGS. 5-7, in other implementations, the functionality of multiple modules may be implemented as a single module or divided in a variety of modules. The memory resource 724 may also be used as a data store to store data used by the display device 700. For example, the memory resource 724 may store a user preference 731 corresponding to a desired boundary location among regions of the panel 710 and/or an image source data 733 corresponding to an image to display at a region of the panel 710, such as a region selected for live input where digital ink input is disabled.

The memory resource 724 includes a gesture input module 732. The gesture input module 732 represents program instructions that when executed by the video processor 722 cause the video processor 722 to identify input received via the input layer 714 and determine the gesture corresponding to the identified input relates to adjustment of a boundary of the virtual regions of the display. For example, the gesture input module 732 may cause the video processor 722 to identify a resize gesture to move a boundary of a digital ink input region to have a different length and/or height. Execution of the gesture input module 732 may cause the boundary module 734 to execute to set the new boundary as changed by the adjustment indicated by the gesture input identified by video processor 722 (via execution of the gesture input module 732).

The memory resource 724 includes a reference module 738. The reference module 738 represents program instructions that when executed by the video processor 722 cause a reference image to display at the region designated to received digital ink input. A reference image is visual output for providing orientation or other assistance in providing digital ink input. A reference image may be a navigation pattern and/or a trace image. For example, the user may be allowed to select from a number of various navigation patterns via execution of the reference module 738 by the video processor 722. When the user selects a trace image to be shown on the digital ink enabled region, the video processor 722 may, in response, perform a visual modification to the image source data 733, such as the visual imagery depicted by the image output layer 712 corresponding to a region with digital ink input disabled. In some examples, the user may select the input source to be used for generating the trace image. For example, the user may select an input source, such as a file stored locally or remotely, a camera, or other source capable of providing image data. Upon selection of the input source, that image source data 733 may be, for example, sent to an image compositor (which may be executed by the video processor 722) to add in reference edges or other portion of altered visual input at the digital ink input region to assist the creative professional in providing digital ink input at a desired location. In some examples, the input received at the region designated for digital ink input is restricted from being received unless the input is within the trace image bounds. For example, a video processor may restrict digital ink input to an edge of the trace image by disregarding digital ink input outside of the edge of the trace image or outside of an area bordered by the edges determined by performing an edge detection operation.

The memory resource 724 includes a scale module 740. The scale module 740 represents program instructions that when executed by the video processor 722 cause a region of the image output layer 712 to display a scaled view (e.g., a view with visual dimensions different from the original resolution of the image source data 733) of an image based on the visual dimensions of the region. For example, a first region of the image output layer 712 may display an image in production at full resolution and the second region may display a scaled view of the image of the first region (e.g., zoomed in or zoomed out, rotated, etc.) when the display device 700 is in direct ink mode (i.e., where the digital ink input region of the input layer 714 also shows imagery at the corresponding image output layer 712 at the same region of the panel such that the user appears to be writing directly on to the image display in the second region). The navigation pattern and/or trace image displayed via a region of the image output layer 712 that corresponds to the digital ink input region 714 may be scaled in accordance with the scale of the image output at the image output layer at that region, such as in the example when the display device is in indirect ink mode (i.e., where the second region of the image output layer corresponding to the digital ink input region of the input layer 714 does not show the imagery of the first region such that the user appears to be writing onto an indirect digital ink surface). The scale module 740 may be executed in response to a determination of an adjustment in the size of a region, such that the set of visual dimensions of image data output to the region corresponding to the boundary change is adjusted. A set of visual dimension includes data corresponding to attributes of the image data to be shown, such as the height and width of pixels of the image to be displayed, a pixel resolution, a relative location to other output regions, a color profile, etc.

In some examples, the scale of the output image at a region of the image output layer 712 of the panel is different than the output sent to the communication interface 742, such as allowing the external display device to maintain a set of visual dimensions while the visual dimensions of the display device 700 are adjusted. In some examples, the image output at a region of the image output layer 712 is virtualized with output to the I/O port, such that the visual dimensions displayed on an external display device adjust in accordance with changes to scale on the region of the image output layer 712 that displays the image in the region where the digital ink input is disabled. In some examples, a first virtual region of the display device 700 encompasses an entirety of visual output of a panel of the display device 700 (such that the entirety of the panel 710 of the display device 700 may be used as an indirect ink surface) and the visual output data corresponding to a second virtual region is sent to the I/O port to display on an external display device. The digital ink input region may also be virtualized across multiple devices when the connected devices have digital inking capability. In this manner, the modules of the memory resource 724 may be executed by the video processor 722 to map digital ink input received by the display device 700 across visual dimensions that include the visual dimensions allocated to the image output region of the display device and the visual dimensions allocated to the external display device.

Referring to FIGS. 5-7, the modules may be distributed across devices. The modules may complete or assist completion of operations performed in describing another module. In some examples, the circuitry of the display device (e.g., a controller or video processor) may perform example methods described in connection with FIGS. 8-11.

FIGS. 8-11 are flow diagrams depicting example methods 800, 900, and 1000 of defining display regions. The operations discussed herein with respect to methods 800, 900, 1000, and 1100 are performable on a processor resource of a display device, such as a video processor 722 of FIG. 7.

Figure 8:
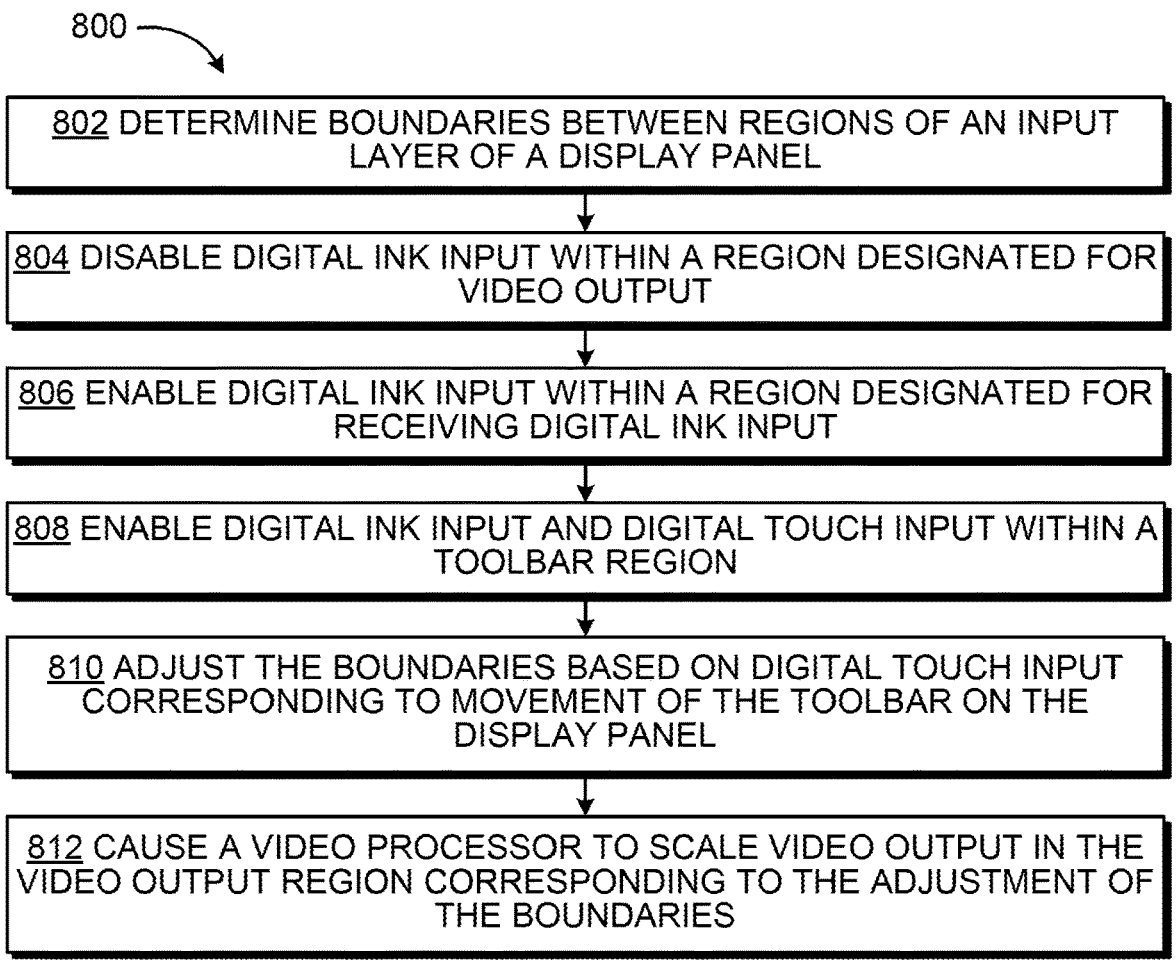
FIGS. 8-11 are flow diagrams depicting example methods of defining display regions.

Referring to FIG. 8, example method 800 of defining a display region may generally comprise determining boundaries between display regions, disabling digital ink input within a first display region, enabling digital ink input within a second display region, enabling digital ink input and digital touch input within a third region, adjusting the boundaries based on digital touch input corresponding to movement of a toolbar, and causing a video processor to scale video output based on the boundary adjustment. The operations discussed with respect to the method 800 may be performed by components of a display device, such as the components discussed with respect to display device 500 of FIG. 5.

At block 802, boundaries between regions of an input layer of a panel of a display are determined. For example, the boundaries between regions may be set initially based on a default location selected by a user of a display device. Example defaults may include virtually splitting the panel in half, thirds, or the first region a quarter of the screen and the other region three-quarters of the screen. In some examples, the region sizes may be set by a ratio, such as 3:1, and the user may be able to toggle between a number of predetermined region sizes using the toolbar, a gesture, or other appropriate input.

At block 804, digital ink input is disabled within a region designated for video output. At block 806, digital ink input is enabled within a region designated for receiving digital ink input. At block 808, digital ink input and digital touch input is enabled within a region designated for a toolbar. For example, the restrictions on the video output region and digital ink input region may be removed for the toolbar region, which is designated to receive all input forms to allow for proper interaction with the toolbar. For example, a gesture input may be made on the toolbar region to move the toolbar region, such as to increase the size of the region designated for digital ink input. At block 810, the boundaries between the regions of the panel are adjusted based on input, such as digital touch input, corresponding to movement of the toolbar on the panel of the display device. At block 812, a video processor is caused to scale vide output in the video output region in accordance with the adjustment of the boundaries made at block 810.

Figure 9:
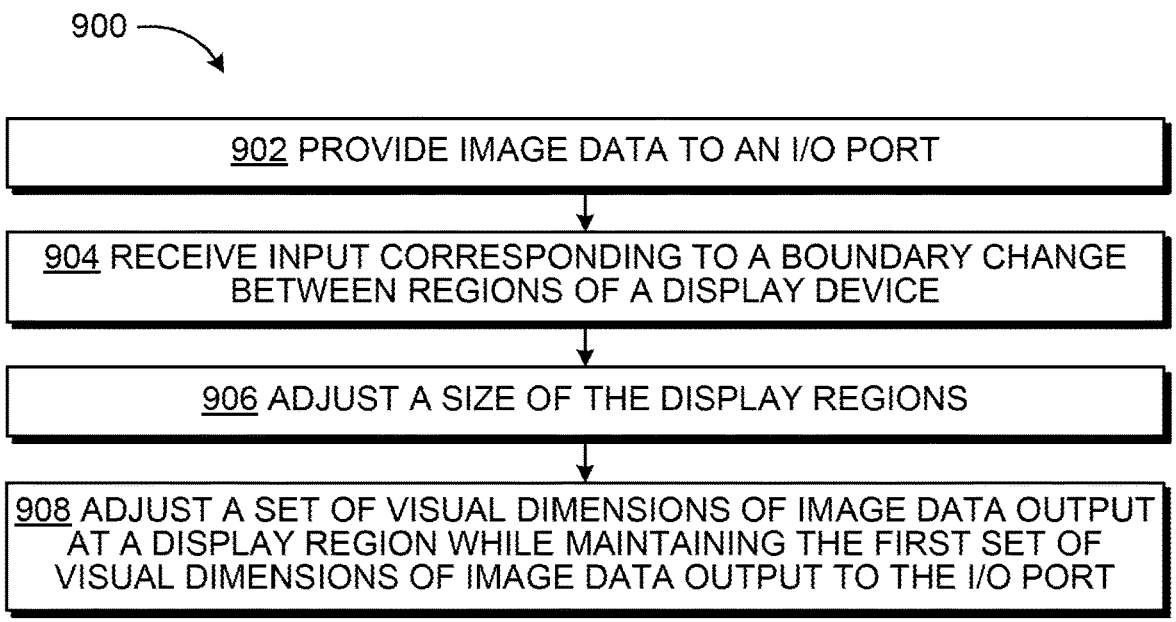

Referring to FIG. 9, example method 900 of defining a display region may generally comprise providing image data, receiving input corresponding to a boundary change between display regions, adjusting a size of a display region, and adjusting a set of visual dimensions of image data output at a display region. The operations discussed with respect to the method 900 may be performed by components of a display device, such as the components discussed with respect to display device 500 of FIG. 5.

At block 902, image data is provided to a communication interface (such as communication interface 740 of FIG. 7) by a processor resource, such as a video processor. For example, video data may be sent across a connection to an external display device via an I/O port as coordinated by the video processor of the host display device. A video processor of a display device, for example, may provide image data to an I/O port, where the image data has a first set of visual dimensions to be displayed on a display device connected to the I/O port which may be the same or different set of visual dimensions of the image data to be displayed on host display device.

At block 904, input corresponding to a boundary change between regions of a display device (such as the host display device in the example above) is received. For example, the display device may include a panel with an input layer capable of receiving capacitive touch input and identifying that the capacitive touch input corresponds to a drag gesture on an edge of a window displayed on the panel of the display device. A video processor of a display device, for example, may receive input corresponding to a boundary change between a first region of a display device and a second region of the display device where the first region of the display device outputs the image data at a set of visual dimensions (that may be the same or different from the visual dimensions output for the I/O port) and the second region of the display device is designated to receive digital ink input. In that example, the input is received by the video processor and then analyzed by the video processor to determine that the input corresponds to the boundary change.

In response to the input to change a boundary of a display region, a size of a region of the display device is adjusted at block 906. For example, a video processor of a display device may adjust a size of the second region enabled to receive digital ink input and a size of the first region of the display device designated to present the image data.

In accordance with the boundary change, a set of visual dimensions of image data output at region of the display device are adjusted at block 908. Such adjustments of the region of the display device may occur while maintaining a set of visual dimensions of image data output sent via the I/O port. Indeed, a video processor of a display device, for example, may adjust the second set of visual dimensions of image data output to the first region while maintaining the first set of visual dimensions of image data output to the I/O port. In this manner, image output may be adjusted on a region of the display device without changing the visual dimensions displayed on a connected, external display device, and, thereby, the user may maintain orientation within the electronic document being worked on as well as maintain focus on the particular portion being manipulated by digital ink input, for example.

Figure 10:
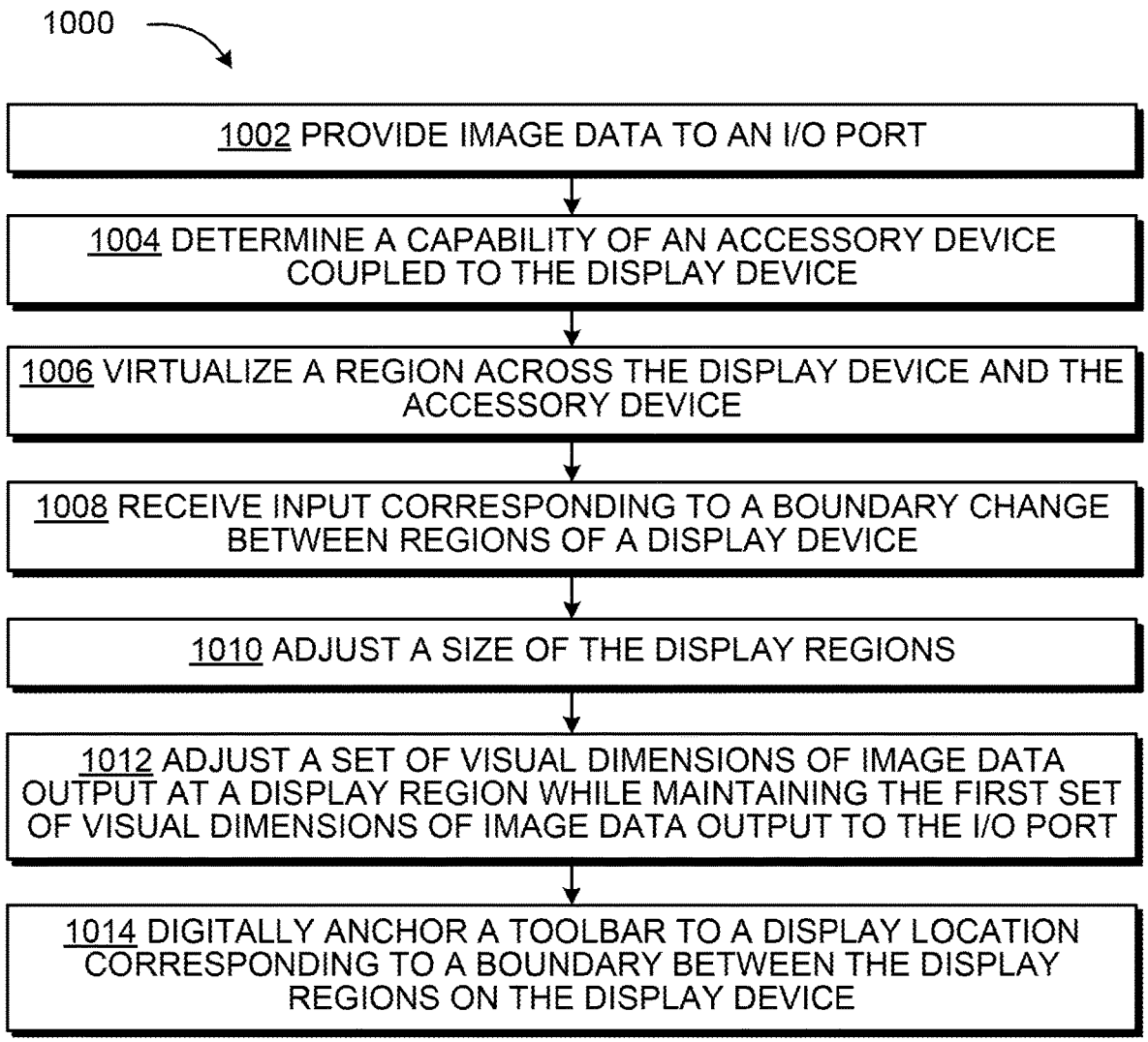

FIG. 10 includes blocks similar to blocks of FIG. 9 and provides additional blocks and details. In particular, FIG. 9 depicts additional blocks and details generally regarding determining capabilities of a connected accessory device, virtualizing a region across the display device and the accessory device based on the capabilities of the accessory device, and anchoring a toolbar to a display location corresponding to a boundary between display regions. Blocks 1002, 1008, 1010, and 1012 are the same as blocks 902, 904, 906, and 908 of FIG. 9, respectively, and, for brevity, their respective descriptions are not repeated in their entirety.

At block 1004, a capability of an accessory device coupled to the display device (e.g., the device receiving the image data provided at block 1002) is determined. For example, a video processor of a display device may determine that an external display device is coupled to the display device or that an external inking-capable display device is coupled to the display device. At block 1006, the regions of the display device are virtualized across the display device and the coupled accessory device based on the determined capabilities. For example, the displayable output may be virtualized across the region of the display device and an external display device when the video processor determines the external display device is designated for displaying video output. For another example, the display region designated for receiving digital ink input may be virtualized across the portion of the display device designated for digital ink input and an inking-capable display device. By virtualizing the regions of the display device, the boundary of the regions (e.g., between the output region and the digital ink input region) may be adjustable across devices and the sizes and visual dimensions of the display regions adjusted in accordance with the boundary adjustment at blocks 1008, 1010, and 1012. In an example, the video processor of a display device may manage the virtualized regions such that the second region of the display device may encompass an entirety of a visual output of a panel of the display device and visual output data corresponding to the first region is sent to the I/O port and such that digital ink input received in the second region is mapped across visual dimensions that include the first set of visual dimensions and the second set of visual dimensions corresponding to each display device respectively. In this manner, digital ink input and/or image output is mapped to locations across a region of the display device and a number of other devices.

At block 1014, a toolbar is digitally anchored to a display location corresponding to a boundary between the regions of the panel of the display device. In this manner, the toolbar may act as a visual representation of the boundary between where digital ink input is enabled and where digital ink input is disabled. By digitally anchoring the toolbar to the boundary between designated display regions, the toolbar moves corresponding with changes to the boundary. In some examples, the boundary may be limited to movement along the dimensions of the panel of the display device. In other examples, the boundary may be moved off the panel of the host display device to the external display device as virtualized at block 1006. The toolbar may be operable in touch-only mode (e.g., digital ink input disabled and touch input is allowed at the region of the toolbar), pen-only mode (e.g., digital touch input disabled and digital ink input is allowed at the region of the toolbar), or touch-and-pen mode (e.g., digital touch input and digital ink input are allowed at the region of the toolbar). The toolbar may include a feature, such as a button, to enable a user-adjustable pattern or a user-adjustable trace image to present on the region of the display device designated for digital ink input. The toolbar may include a feature to change the size, shape, opacity, etc. of the pattern and/or trace image. For example, the toolbar may include an application shortcut and the size of the region and/or a change to the navigation pattern may occur upon selection of the application shortcut. In other examples, the display of the navigation pattern and/or trace image may be enabled or disabled based on a state of operation of the application or independent of application operation state. In this manner, the digital ink input region, such as the digital ink input region 104 of FIG. 1, may be adjustable in size and configurable to include assistance features, such as a navigation pattern or trace image. By providing a fully adjustable region of the display designated for digital ink input, a creative professional may attune their digital experience to improve orientation and work more like they would do so in the physical realm, as examples.

Figure 11:
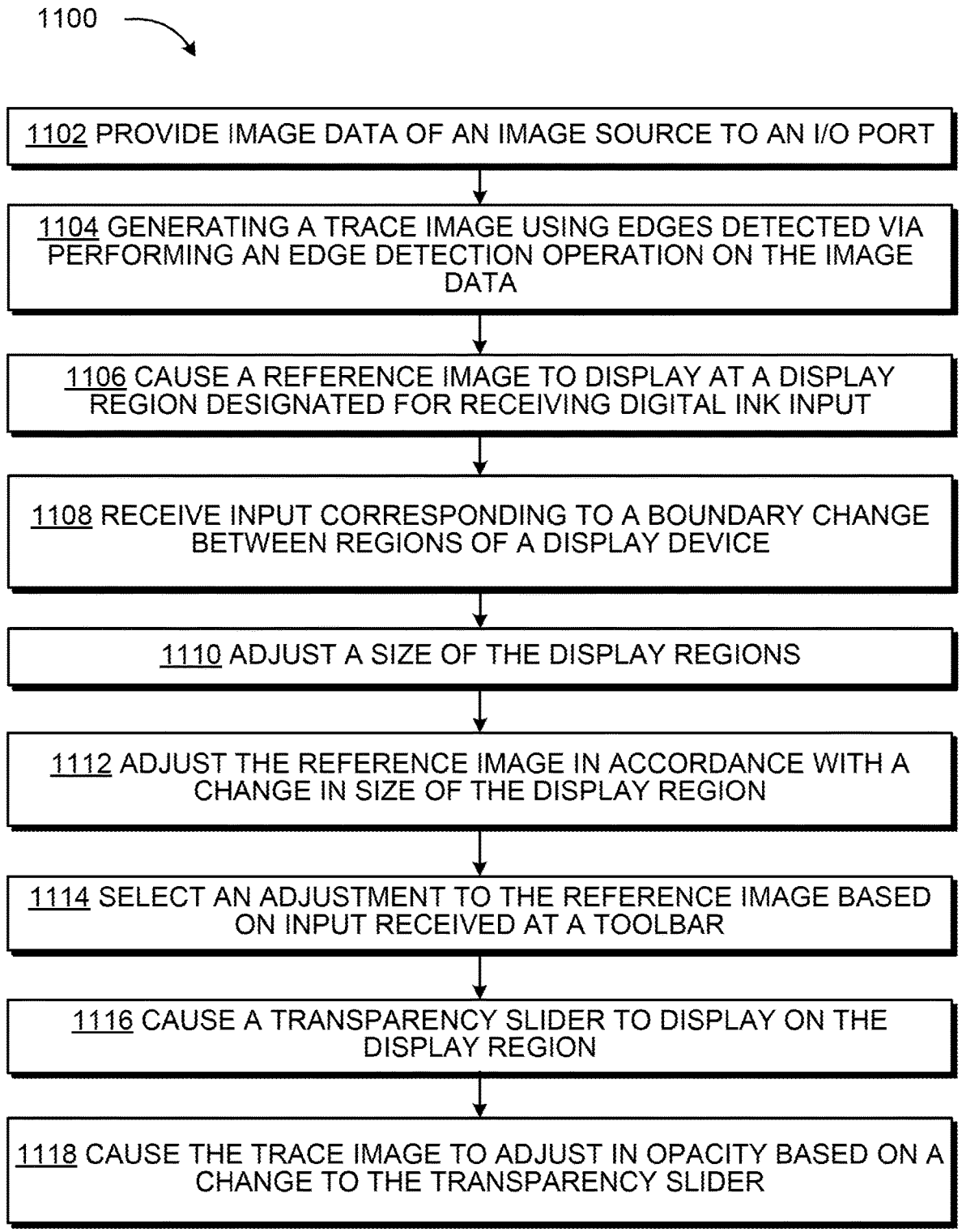

Referring to FIG. 11, example method 1100 of defining a display region may generally comprise providing image data, generating a trace image, causing a reference image to display, receiving input corresponding to a boundary change between display regions, adjusting a size of a display region, adjusting the reference image, and causing a transparency slider to display. The operations discussed with respect to the method 1100 may be performed by components of a display device, such as the components discussed with respect to display device 500 of FIG. 5.

At block 1102, image data of an image source is provided to an I/O port. For example, a set of data corresponding to image data of a picture loaded on the display device may be provided to an I/O port via an I/O port controller such that an external display device may receive the image data to produce visual output.

At block 1104, a trace image is generated. The trace image may be generated by a video processor by performing an edge detection operation on the image data to detect edges of images represented by the image data.

At block 1106, a reference image is caused to display at a display region designated for receiving digital ink input. A reference image, as used herein, may include the trace image generated at block 1104 as well as a navigation pattern. For example, in response to a user selecting to display both a trace image and a navigation pattern, a video processor may generate a reference image by combining the navigation pattern and the altered image data (i.e., trace image) into a single virtual image data layer and provide that single virtual image data layer such that the video processor may cause a frame buffer to alter by overriding pixel data at the locations corresponding to digital ink enable region to be replaced with the reference image data corresponding to the appropriate pixel locations. In an example, the navigation pattern and the trace image may be computed as separate virtual image data layers and combined by a compositor operation performed by the video processor to produce final output data in the frame buffer to be used by a timing controller to operate the image output layer of the panel to present the reference image.

At block 1108, input corresponding to a boundary change between regions of the display device is received and a size of display region is adjusted at block 1110. In response to the boundary change, the reference image is adjusted in accordance with the change in size of the display regions. In this manner, the trace image on the digital ink enable region may shrink, enlarge, crop, etc. in response to changes in the dimensions of the region with digital ink input enabled.

At block 1114, an adjustment to the reference image is selected based on input received at a toolbar. For example, a user may use the pen or a finger to select a pattern selection menu to select one of a variety of selection patterns and the pattern may change in response to the selection of the pattern selection menu made by the user. In some examples, a distance between dots of the navigation pattern is fixed while the size of the trace image changes during adjustment of the display region boundary when the trace image is selected for adjustment. In some examples, the navigation pattern changes in response to selection of a new pattern from a toolbar menu while the trace image remains fixed at an orientation within the display region with digital ink input enabled. In some examples, the trace image and the navigation pattern are combined, such as by showing only the navigation pattern at locations that also coincide with edges of the trace image.

At block 1116, a transparency slider may be caused to display on a display region, such as the region of the display device with digital ink input enabled. The transparency slider is a user interface element that may appear to overlay other visual output on the display region, such as the reference image. In an example, the transparency slider may be computed as a separate virtual image data layer from the virtual image data layer of the reference image. The video processor may cause the transparency slider to display at a selected region of the display device. By providing a user interface element, the navigation pattern and/or trace image may be adjusted visually as desired by the user in a real-time manner. The opacity of the reference image, for example, may be adjusted based on a change to the transparency slider at block 1118. For example, a video processor may determine digital pen input selected and/or moved a visual identifier on the transparency slider, and the video processor may cause the opacity of the trace image to change in opacity in accordance with the position of the visual identifier along the transparency slider. In some cases, the user may remove the trace image and/or navigation pattern by generating input corresponding to moving the visual identifier of the transparency slider to an end of the transparency slider. By providing functionality for the user to select changes to the visual characteristics of the assistive features, select sizes of the display regions, and select enabled input types at the various regions, a creative professional may adjust the creation environment to their particular desires to guide them for accurate expression on a single device, for example.

Although the flow diagrams of FIGS. 8-11 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A display device comprising:
a panel including:
an image output layer to output visual content; and
an input layer to receive digital ink input; and
a controller to:
define a boundary between a first region of the input layer of the panel and a second region of the input layer of the panel based on an identifier associated with a user preference;
disable digital ink input for the first region when the first region is designated for video output; and
enable digital ink input for the second region when the second region is designated for receiving digital ink input.

2. The display device of claim 1, wherein:
the boundary is adjustable based on touch input received by the input layer when the display device is in zone edit mode.

3. The display device of claim 1, wherein:
the input layer of the panel is to receive touch input; and
the controller is to disable touch input for the second region and enable touch input for the first region.

4. The display device of claim 1, wherein:
the second region is to display a scaled view of an image of the first region when the display device is in direct ink mode; and
the second region is to display a navigation pattern when the display device is in indirect ink mode.

5. The display device of claim 1, wherein:
the user preference is a default corresponding to a physical location on the panel where the image output layer folds.

6. A non-transitory computer-readable storage medium (NTCRSM) comprising a set of instructions executable by a processor resource to:
determine a first boundary between a first region of an input layer of a display panel and a second region of the input layer of the display panel;
determine a second boundary between the second region of the input layer and a third region of the input layer of the display panel;
disregard digital ink input within the first region when the first region is designated for video output;
enable touch input and digital ink input within the second region when a toolbar is displayed in the second region; and
enable digital ink input within the third region when the third region is designated for receiving digital ink input.

7. The NTCRSM of claim 6, wherein the set of instructions is executable by the processor resource to:
adjust the first boundary and the second boundary based on touch input on the input layer of the display panel corresponding to movement of the toolbar displayed on the display panel.

8. The NTCRSM of claim 6, wherein the set of instructions is executable by the processor resource to:

cause a video processor to scale video from a host compute device to the first region at a first set of visual dimensions; and cause, when the third region is selected for direct ink mode, the video processor to scale video from the host compute device to the third region at a second set of visual dimensions different from the first set of visual dimensions.

9. The NTCRSM of claim 6, wherein the set of instructions is executable by the processor resource to:

generate, via the video processor, a trace image using an edge detection operation;

cause the video processor to adjust visual dimensions of the first region or the second region based on a signal corresponding to gesture input received at a location of the input layer of the display panel;

cause, by the video processor, the trace image and a navigation pattern to display at the third region based on the adjusted visual dimensions and a user-defined percentage of opacity; and restrict, via the video processor, digital ink input to an edge of the trace image by disregarding digital ink input outside of the edge of the trace image.

10. The NTCRSM of claim 6, wherein the set of instructions is executable by the processor resource to:

cause a video processor to provide ink input data to a host compute device based on digital ink input received within the third region of the input layer of the display panel; and cause the video processor to provide image data corresponding to the input layer of the display panel at the third region to an auxiliary display device coupled to the host compute device, the auxiliary display device to generate a visual representation corresponding to video output associated with visual output displayed at the first region of the display panel.

11. A method of defining display regions, the method comprising:

providing, via a video processor, image data to an input/output (I/O) port, the image data having a first set of visual dimensions;

receiving, via the video processor, input corresponding to a boundary change between a first region of a display device and a second region of the display device, the first region of the display device to output the image data at a second set of visual dimensions and the second region of the display device to receive digital ink input;

adjusting, via the video processor, a size of the second region to receive digital ink input and a size of the first region of the display device to output the image data; and adjusting, via the video processor, the second set of visual dimensions of image data output to the first region while maintaining the first set of visual dimensions of image data output to the I/O port.

12. The method of claim 11, wherein:

the second region of the display device to encompass an entirety of a visual output of a panel of the display device and a visual output corresponding to the first region, and digital ink input received in the second region is mapped, by the video processor, across visual dimensions that include the first set of visual dimensions and the second set of visual dimensions.

13. The method of claim 11, further comprising:

determining, via the video processor, that an inking-capable display is coupled to the display device; and virtualizing, via the video processor, a displayable region across the display device and the inking-capable display, such that a boundary between the first region and the second region is adjustable across the display device and the inking-capable display.

14. The method of claim 11, further comprising:

digitally anchoring, via the video processor, a toolbar to a display location corresponding to a boundary between the first region and the second region, wherein the toolbar moves corresponding with changes to the boundary and the region of the toolbar is operable in a touch-only mode, a pen-only mode, or a touch-and-pen mode; and wherein the toolbar includes a feature to enable a user-adjustable pattern to present on the second region of the display.

15. The method of claim 11, further comprising:

performing, via the video processor, an edge detection operation on the image data;

generating, via the video processor, a trace image using an edge detected via the performing the edge detection operation;

selecting, via the video processor, an adjustment to a navigation pattern, the trace image, or both, in response to user input;

causing, via the video processor, a transparency slider to display on the second region of the display device designated for receiving digital ink input; and causing, via the video processor, a percentage of opacity of the trace image to adjust according to input received at a location of the transparency slider while the navigation pattern maintains an opacity different from the trace image.

* * * * *